Nov. 11, 1958 G. M. SITRIN 2,859,790
WELDING NUT WITH PILOT PORTION DEFINED BY FLANGES
AND HAVING WELDING PROJECTIONS ON SAID FLANGES
Filed Dec. 28, 1956
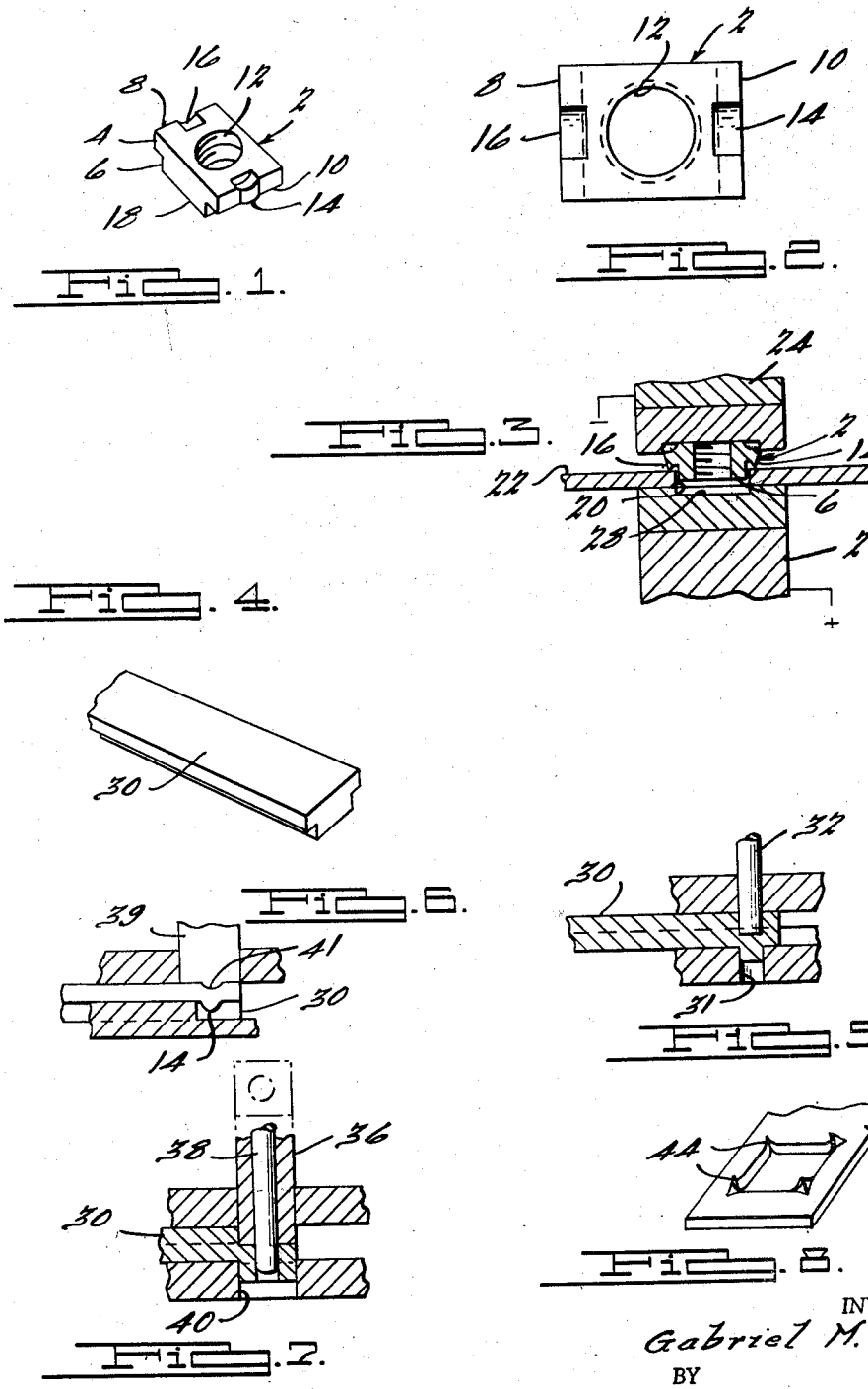
INVENTOR.
Gabriel M. Sitrin.
BY
Harness, Dickey & Pierce.
ATTORNEYS.

United States Patent Office 2,859,790
Patented Nov. 11, 1958

2,859,790

WELDING NUT WITH PILOT PORTION DEFINED BY FLANGES AND HAVING WELDING PROJECTIONS ON SAID FLANGES

Gabriel M. Sitrin, Detroit, Mich., assignor to Carrick Products, Royal Oak, Mich., a corporation of Michigan Application December 28, 1956, Serial No. 631,229

1 Claim. (Cl. 151—41.7)

The present invention relates to a flanged nut having welding projections thereon and, more particularly, to a flanged nut having a T-shaped cross-section with welding projections on the underside of each of the flanges.

In the manufacture of automobiles, stoves, refrigerators and similar articles, it is often necessary to bolt an object to metal plates or parts wherein a nut must be disposed in an inaccessible position. To accomplish this, it is the practice to either swage or weld the nut to the plate with its threaded hole concentric with the hole in the plate before assembly. The weld or swage serves to fix the nut until the bolt is inserted during an assembly operation.

The present invention relates to the latter application of welding the nuts in place. An example of such a welded nut is Patent No. 2,073,467 to Demboski et al. wherein a conventional nut having projections on each of the four corners of its undersurface is projection welded to a plate. To assure that the nut is centered relative to the hole in the plate, a centering pin is disposed in the lower welding electrode as disclosed in Fig. 9 of the patent to Demboski. Experience has proved that such a welding nut is very undesirable because it tends to skid sidewardly when subjected to pressure by the welding electrodes during the welding operation, to such an extent that it is no longer centered with respect to the hole in the plate when the weld is completed. In addition, the centering pin exerts a lateral pressure on the internal threads of the nut in an effort to resist this sideward skidding and oftentimes impresses a flat on the threads or otherwise mars them. This requires that the threads be retapped after the welding operation.

Experience has further proved that the welding nuts of the prior art employing projection welding principles are heated to a white-hot condition. Consequently, any chips or other foreign matter clinging to the threads of the nut will be fused thereto and the pressure exerted by the welding electrodes on the white-hot nut will deform the threads. Further, heating the nut to a white-hot condition forms a scale on the threads of the nut and the molten metal created during the welding operation will flow sidewardly and project into the internally threaded hole of the nut.

When any one of the foregoing disadvantages occurs, the nut must be retapped after it is welded, and as a practical matter this retapping is performed on each of the welded nuts. Since literally millions of these welding nuts are employed, the additional retapping operation is extremely expensive and undesirable.

Two further disadvantages which, although undesirable, do not require an additional machining operation are: deformation of the plate by the welding projections due to the intense heat and pressure, and burning and discoloring of the plate due to the intense heat of the welding operation.

The present invention overcomes the foregoing problems of the prior art by providing a rectangular nut having a T-shaped cross section with a welding projection disposed on the underside of each of its flanges. The projections may be punched into the flanges either during the initial manufacture of the nut by adding a suitable projection to one of the dies or they may be punched into the flanges as a separate operation after the nut is manufactured.

By locating the welding projections on the underside of the flanges of the nut which are relatively thin, the welding current has to flow only through the thickness of the relatively thin flanges rather than through the entire thickness of the nut. As a direct result, the flanged nut of the present invention is not heated to the elevated temperature of the prior art nuts during the welding operation. This overcomes the foregoing disadvantages of the prior art and eliminates the need for an additional machining operation to retap the threads of the nut.

Therefore, it is an object of the present invention to provide a nut which can be projection welded to a plate without requiring a subsequent machining operation.

It is a further object of the present invention to provide a welding nut which is not excessively heated during the welding operation.

It is a still further object of the present invention to provide a welding nut which centers itself with respect to the hole relative to which it is to be welded.

It is a still further object of the present invention to provide a projection welded nut which is relatively inexpensive to manufacture, readily handled in automatic attaching machines, and can be produced by standard machines and equipment already available without waste of material.

Other objects and features of novelty of the present invention will become apparent when referring, for a better understanding of the invention, to the accompanying drawings, wherein:

Fig. 1 is a perspective view of the welding nut of the present invention;

Fig. 2 is an enlarged plan view of the welding nut of the present invention;

Fig. 3 is a cross-sectional view of a welding nut of the present invention in position to be welded;

Fig. 4 is an isometric view of the bar stock from which the welding nuts of the present invention are manufactured;

Fig. 5 is a schematic view of the first step of the process for making the welding nut wherein the hole is punched;

Fig. 6 is a schematic view similar to Fig. 5 but illustrating the second step wherein the welding projections are formed;

Fig. 7 is a schematic view similar to Fig. 5 but illustrating the third step wherein the nut is sheared from the bar stock; and Fig. 8 is a broken isometric view of an embodiment of the present invention wherein the welding projections are on a plate.

Referring to Figs. 1 and 2, the welding nut 2 of the present invention is comprised of a conventional well-known T-nut as illustrated in Fig. 1 of Patent No. 2,110,039 to P. E. Double having a collar portion 4 and a body portion 6. The body portion 6 is preferably square in shape to enable it to be readily inserted into a square hole in a metal plate or part. It is not intended, however, to limit the invention to square nuts since rectangular shapes or even other forms can be satisfactorily used.

A tapped hole 12 is formed through the center of the nut and provides means for receiving and holding the bolt or screw which is used in cooperation with the nut to assemble parts. The collar 4 comprises two laterally extending flanges 8 and 10 which provide means for preventing the nut from being disengaged from the plate 22 (Fig. 3) in one direction. Disengagement in the other direction is prevented by welding as hereinafter described in detail.

Two projections 14 and 16 are formed in both of the flanges 8 and 10 to enable the welding nut 2 to be projection welded in place. They may be punched into the nut 2 either as a separate operation after their manufacture or during their manufacture as will hereinafter be described. The projections 14 and 16 are not of any specific contour, shape or form since the only limitation is that they do not extend downwardly from the undersides of the flanges below the lower surface 18 of the nut. This is to insure that they do not interfere with the positioning of a portion of the body portion 6 in a hole to center the nut with respect to the hole.

Referring to Fig. 3, the welding nut 2 is illustrated with the body portion 6 disposed in a square hole 20 in a plate 22 with the projections 14 and 16 engaging the surface of the plate 22. Welding electrodes 24 and 26 are adapted to engage the welding nut 2 and the plate 22 respectively so as to exert pressure and resistance weld the nut to the plate at the projections. It will be noted that the lower welding electrode 26 has a recess 28 therein to accommodate any projection of the body 6 below the lower surface of the plate 22 after the weld is completed.

By locating the projections 14 and 16 on the flanges 8 and 10, the welding current passes through the relatively thin flanges, rather than through the entire thickness of the nut as in the case of the aforesaid patent to Demboski. Because of the shorter path, the nut is not heated as much during the welding operation and, therefore, damage to the threads of the tapped hole 12 is eliminated. Consequently, the necessity of a separate machining operation to retap each of the welded nuts is also eliminated. When viewed in context with the millions of welded nuts employed in such applications, the tremendous savings which can be achieved through eliminating the retapping operation can readily be appreciated.

By combining this advantage with those pointed out at the beginning of this application together with the inherent advantages of a T-shaped nut, as pointed out in the patent to Double, No. 2,110,039, it will be seen that the present invention provides one of the most desirable welding nuts in the industry today. In addition to these advantages, the square body portion 6 of the present invention will cooperate with the square hole 20 to eliminate the need for a centering pin with its attendant disadvantages. This cooperation between the body portion 6 and the square hole 20 not only prevents the sideward skidding of the nut during the welding operation, one of the major problems of the prior art, but also prevents the nut from rotating when torque is applied to the nut by the insertion and tightening of a bolt. Because of the latter feature, the weld between the projections and the plate need only resist longitudinal forces. In contrast to this, the welding nuts of the prior art rely solely on the welds to resist torque applied to the nut when tightening a bolt therein and if the weld should break there is nothing to prevent the nut from rotating. Since the nut is generally located in an inaccessible position, it is obvious that such a condition cannot be tolerated.

Referring to Figs. 4 through 6, one method for manufacturing the T-shaped nuts of the present invention is to feed T-shaped bar stock 30 into a nut-making machine of any desired type equipped with progressive dies. Since the machinery itself forms no part of the present invention, it is not illustrated. In Fig. 5, a punching die 32 is illustrated which is adapted to co-act with an aperture 31 to punch out the hole in the nut which is later tapped with a proper thread. After the punching operation the welding projections 14 are formed as illustrated in Fig. 6 by an upper die member 39 having a projection 41 on either side thereof. The final step of the progressive operation is illustrated in Fig. 7 wherein the nut is severed from the bar stock 30 by an upper die member 36 adapted to co-act with the aperture 40. A locating pin 38 is disposed within the upper die 36 to center it with respect to the hole in the nut to be severed. The above operations are performed with the dies aligned in the conventional progressive manner wherein each of the steps is performed simultaneously. Consequently, with each advancement of the bar stock 30, one nut is produced. From this description it can be appreciated that it is a relatively simple matter to alter the dies of existing nut-making machinery to produce the welding nut of the present invention.

Referring to Fig. 8, another embodiment of the present invention is illustrated wherein the welding projections 44 are formed on the plate 22, rather than on the flanges of the T-nut. A standard T-nut without projections is employed and the procedure for welding is the same as that illustrated in Fig. 3 wherein the current takes the same direct path through the relatively thin flanges to the projections 44 on the plate.

Placing the welding projections 44 at the corners of the square aperture enables them to be formed in an extremely simple and inexpensive manner. Conventional methods for punching the square hole 20 in the plate 22 may be employed wherein the only alteration required is the relief of the corners of the aperture in the lower die. No changes whatsoever are made in the upper punching die. Under this arrangement, there is no immediate shearing action between the upper and lower dies at the corners and consequently the welding projections are formed. Of course, more elaborate methods for producing projections on the plate could be used and still take advantage of the principles of the present invention.

What is claimed is:

A welding nut formed from T-shaped bar stock comprising a substantially square body portion of uniform thickness and a pair of outwardly extending flat transverse flanges having welding projections thereon, said projections being formed from material displaced from the edges of said flanges intermediate the ends thereof, the portion of said body projecting from said flanges providing a pilot portion, said welding projections being disposed on the same side of said flanges as said pilot portion and extending a lesser distance from said flanges than said pilot portion.

References Cited in the file of this patent

UNITED STATES PATENTS

| | | |
|---|---|---|
| 1,919,552 | Hasselquist | July 25, 1933 |
| 2,042,953 | McArdle et al. | June 2, 1936 |
| 2,110,039 | Double | Mar. 1, 1938 |
| 2,279,574 | Langmaid | Apr. 14, 1942 |
| 2,335,593 | Howe | Nov. 30, 1943 |
| 2,372,772 | Ellis et al. | Apr. 3, 1945 |
| 2,612,647 | Howe | Oct. 7, 1952 |

FOREIGN PATENTS

| | | |
|---|---|---|
| 647,312 | Great Britain | Dec. 13, 1950 |
| 732,714 | Great Britain | June 29, 1955 |